(12) United States Patent
Noe

(10) Patent No.: US 8,096,571 B1
(45) Date of Patent: Jan. 17, 2012

(54) TRACTOR HITCH ASSEMBLY AND TRAILER WITH HYDRAULIC PUMP

(76) Inventor: Richard Dale Noe, Kirksville, MO (US)

( * ) Notice: Subject to any disclaimer, the term of this patent is extended or adjusted under 35 U.S.C. 154(b) by 0 days.

(21) Appl. No.: 12/902,950

(22) Filed: Oct. 12, 2010

(51) Int. Cl.
*B62D 53/02* (2006.01)

(52) U.S. Cl. .................. 280/492; 280/493; 180/53.4

(58) Field of Classification Search .............. 280/433, 280/492, 493, 494; 180/53.1, 53.3, 53.4; 172/449, 679, 677, 680, 433
See application file for complete search history.

(56) References Cited

U.S. PATENT DOCUMENTS

| | | | |
|---|---|---|---|
| 2,375,970 A * | 5/1945 | Williams, Jr. ................. 172/453 |
| 3,062,561 A * | 11/1962 | Wulff et al. ................... 172/439 |
| 3,649,048 A * | 3/1972 | Garnett ......................... 280/477 |
| 4,662,162 A | 5/1987 | Bettencourt et al. |
| 4,805,927 A | 2/1989 | Stephenson et al. |
| 4,838,358 A * | 6/1989 | Freudendahl ................. 172/125 |
| 5,152,357 A * | 10/1992 | McLean et al. .............. 180/53.3 |
| 5,322,327 A | 6/1994 | Steffinger |
| 5,531,283 A | 7/1996 | Austin et al. |
| 5,706,901 A * | 1/1998 | Walters et al. ................ 172/439 |
| 5,816,339 A | 10/1998 | Parsons et al. |
| 6,412,570 B1 | 7/2002 | Pruitt et al. |
| 6,625,964 B2 * | 9/2003 | McLeod et al. ................ 56/11.9 |
| 6,742,600 B2 | 6/2004 | Hoelscher |
| 6,776,432 B2 | 8/2004 | Harkcom et al. |
| 6,877,758 B2 | 4/2005 | Colistro |
| 7,055,618 B2 * | 6/2006 | Ehrhart et al. ................ 172/449 |
| 7,264,064 B2 | 9/2007 | Ehrhart et al. |
| 7,308,947 B2 | 12/2007 | Barnett |
| 2006/0086512 A1 * | 4/2006 | Ehrhart et al. ................ 172/677 |
| 2007/0199293 A1 * | 8/2007 | Barnett .......................... 56/11.9 |

\* cited by examiner

*Primary Examiner* — Paul N Dickson
*Assistant Examiner* — Tashiana Adams
(74) *Attorney, Agent, or Firm* — Erickson, Kernell, Derusseau & Kleypas, LLC

(57) ABSTRACT

A tractor hitch assembly comprises a drawbar with a hydraulic pump mounted to a pump mount extending below the drawbar and drawbar couplers formed thereon. A trailer tongue coupler is pivotally connected to the drawbar for pivoting about a roll axis and a yaw axis. The tongue of a trailer is removably securable to the trailer tongue coupler in a plurality of selected vertical alignments. The trailer tongue is formed integral with a main beam of the trailer frame extending the length of the trailer.

11 Claims, 4 Drawing Sheets

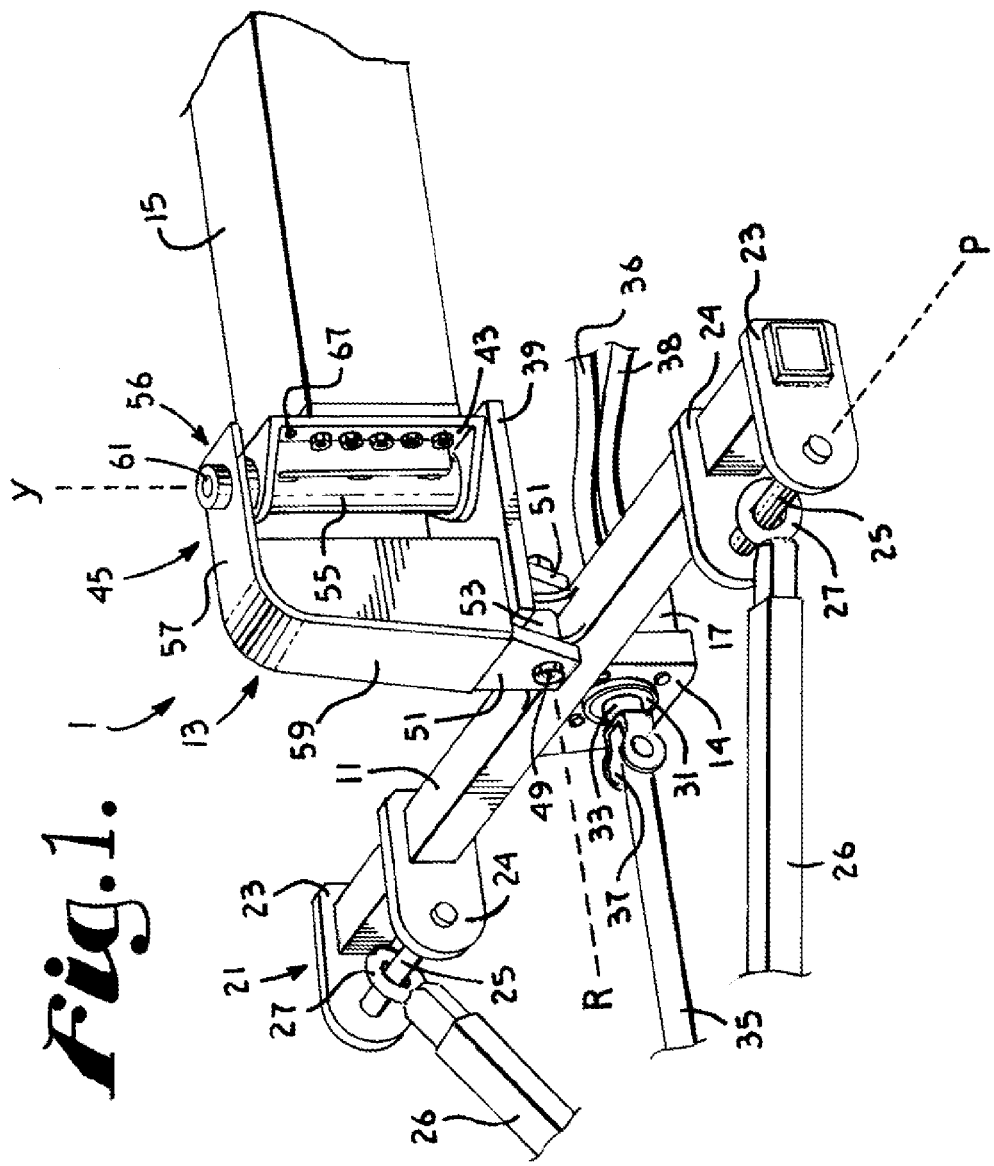

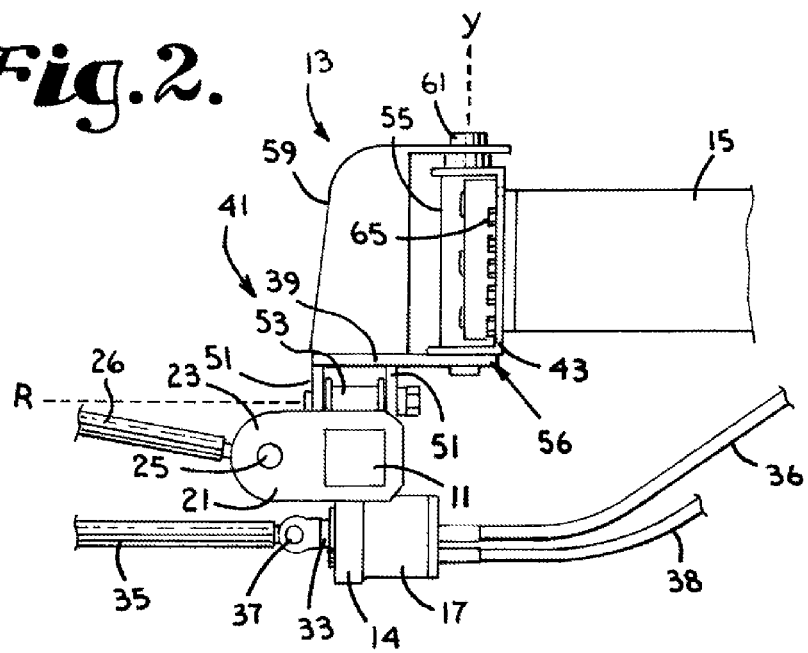
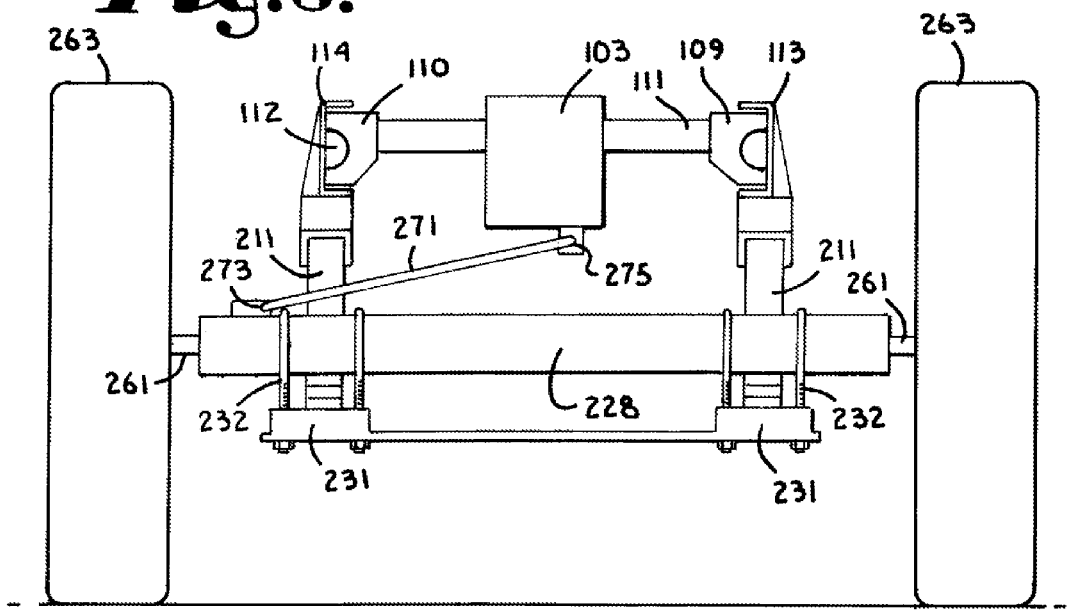

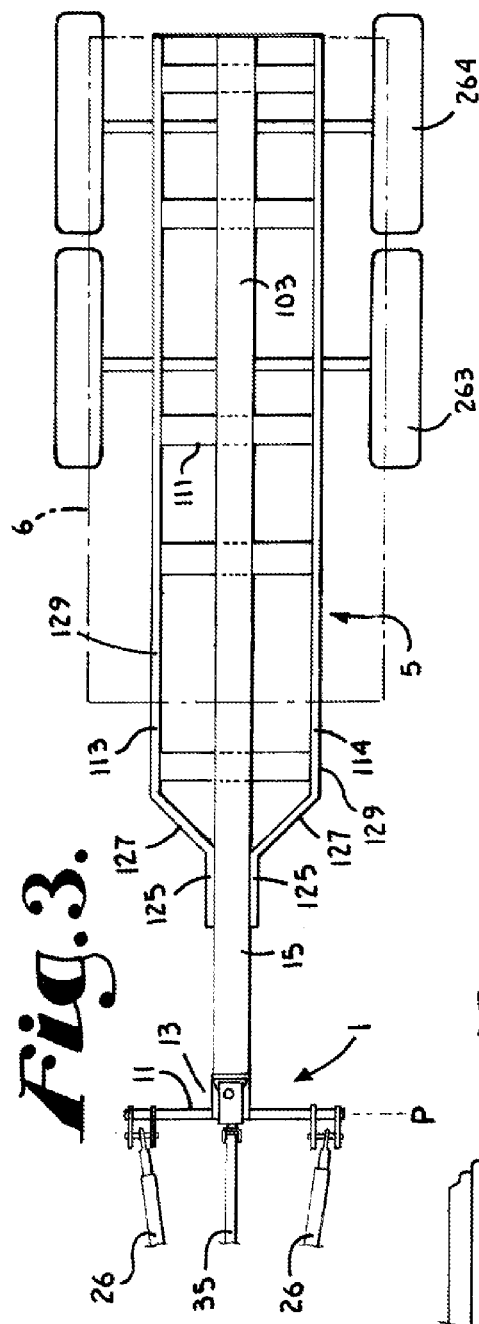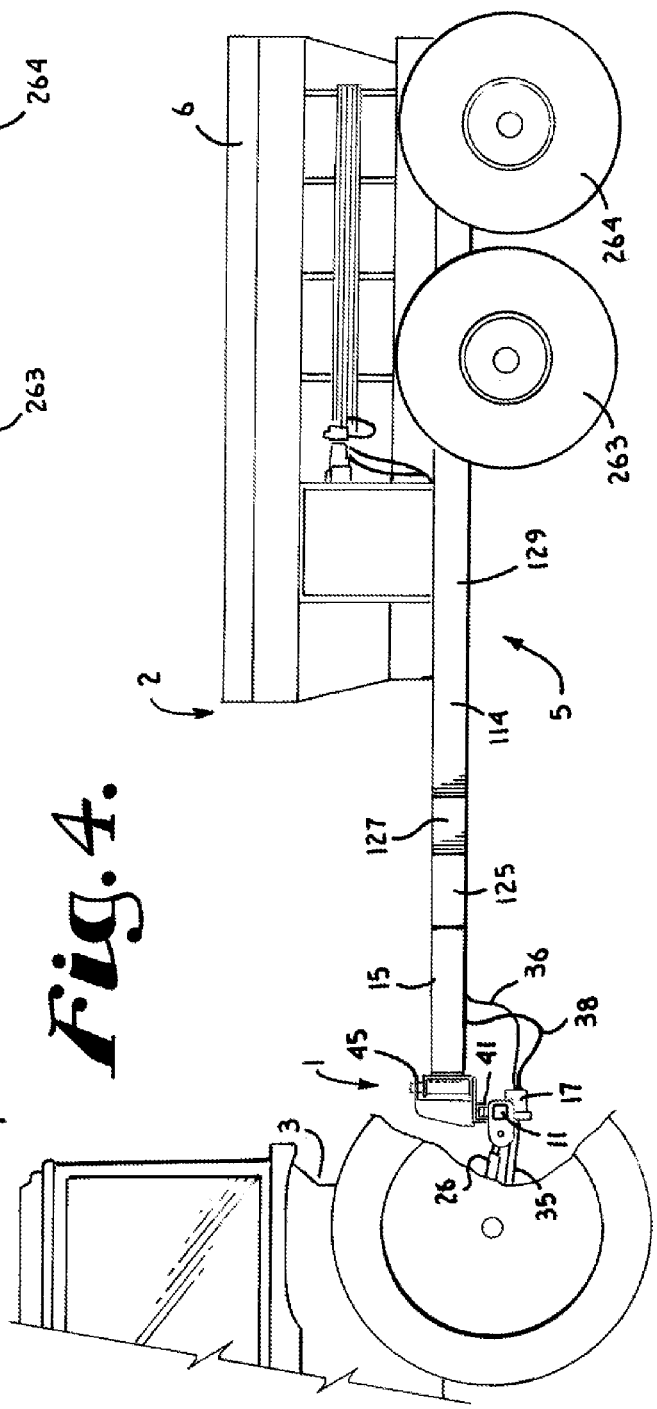

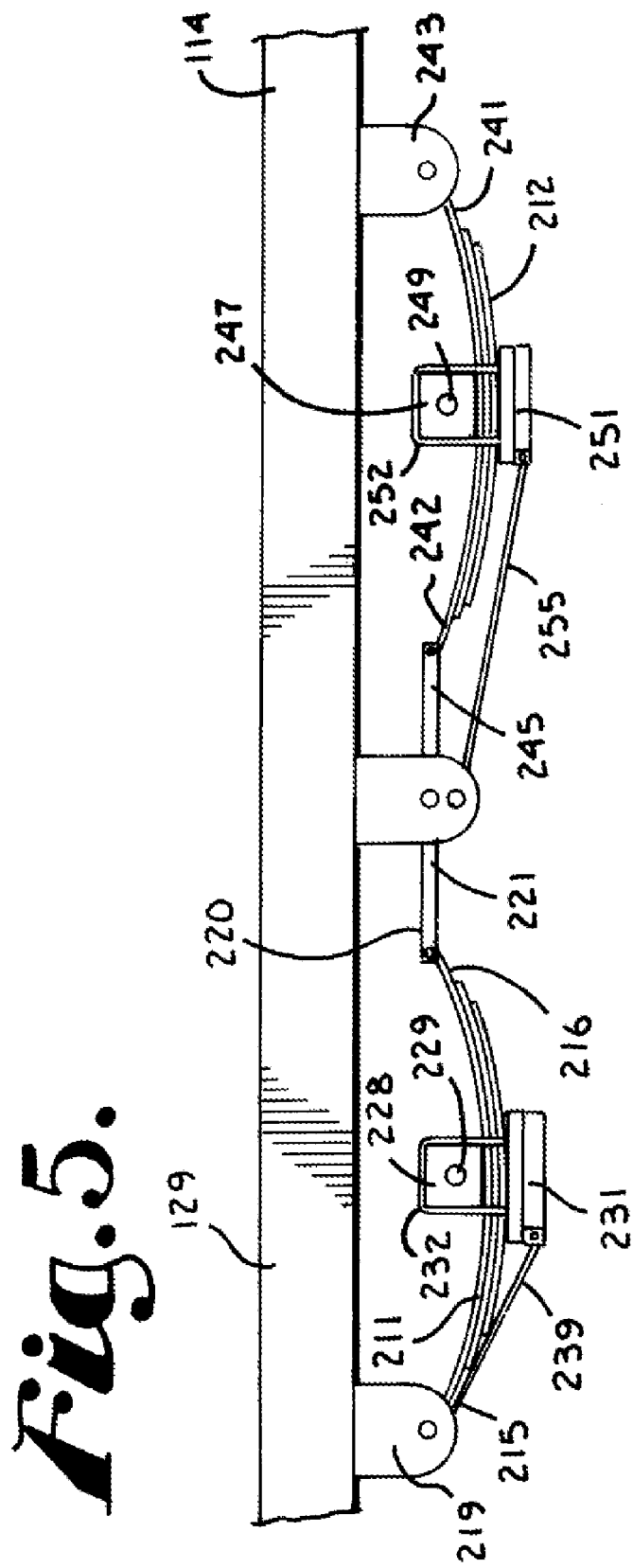

TRACTOR HITCH ASSEMBLY AND TRAILER WITH HYDRAULIC PUMP

BACKGROUND OF THE INVENTION

1. Field of the Invention

This invention relates to a trailer with a tractor hitch and hydraulic pump, and in particular, to a tractor hitch assembly having a hydraulic pump attached thereon and further attaching to a tractor tongue extending through the trailer structure.

2. Background & Description of the Related Art

In farming operations, various agricultural implements are commonly pulled and powered by an agricultural tractor. The implements, such as a spreader, normally have a pivoting tongue which is affixed at one end to a tractor drawbar, and, at the other end to the implement. Mechanical power to the implement is often provided by a power-take-off (PTO) shaft of the tractor. The PTO may provide direct drive to the mechanical components of the implement or may power a hydraulic pump which, in turn, provides hydraulic power to the various components of the implement.

Mechanically driven pull-type agricultural implements couple to hitch arms of the tractor and have a mechanical linkage which connects the PTO shaft of the tractor to the mechanically driven elements of the agricultural implement thereby communicating power. Often, however, it is desirable to provide power to the drive elements of the agricultural implement hydraulically. Although hydraulic drive systems generally result in poorer drive transmission efficiencies compared to mechanical drive systems, hydraulic drive systems generally offer more accurate control of input torque, less maintenance of the system and fewer moving parts.

Hydraulically driven pull-type agricultural implements are generally provided with a pump having a drive shaft that attaches to the PTO shaft of the tractor. The hydraulic pump generates a flow of high pressure hydraulic fluid which passes through a hydraulic line to a motor or driven element of the agricultural implement. A return line runs from the driven element through a filter and into a sump tank which is commonly provided as the hollow interior of a tubular hitch arm or other reservoir capable of storing the hydraulic fluid.

Simple construction of a hydraulic drive system typically comprises a direct mechanical connection between the PTO shaft and the drive shaft of the hydraulic pump. It is common to mount the pumps to control hydraulic systems on tow behind implements on the implement itself, particularly where the hydraulically operated equipment on the implement requires high pressure and flow rates requiring a larger pump. In existing applications, with the pump mounted on the implement, a relatively long PTO shaft is connected between the tractor and the pump for driving the pump. The increased length of the PTO shaft reduces the turning radius of the tractor relative to the implement and increases the risk of damaging the PTO shaft when turning.

Pull-type agricultural implements are commonly supported by a frame which is supported by a plurality of wheels. As disclosed by the prior art, it is common for a trailer to have a box type frame with two longitudinal supports arranged at a transverse distance from one another and fixedly connected with a front and a rear transverse support. The horizontal orientation of the frame with the longitudinal supports and the transverse supports provide a frame having a width over its entire length corresponding to the length of the transverse support. A shortcoming of such a trailer frame is that the trailer requires significant bracing to support the heavy load of an agricultural implement such as a spreader and torqueing of the frame while turning. The increased weight associated with the additional bracing increases the fuel costs associated with agricultural operations.

In order to improve upon the shortcomings of the prior art, a trailer assembly is needed that reduces the weight of the trailer assembly and sufficiently supports a hydraulic pump without.

SUMMARY OF THE INVENTION

The present invention includes a hitch assembly generally comprising a drawbar having two latch members or drawbar couplers for coupling to hydraulic lift arms of a tractor, a trailer tongue coupler pivotally connected to the drawbar and a hydraulic pump mounted below the drawbar and the drawbar couplers. A pump mounting support extends downwardly from the bottom surface of the drawbar and the hydraulic pump is mounted to the rear side thereof. The drive shaft of the hydraulic pump extends forwardly through the mounting plate to connect to the PTO shaft extending from the rear of the tractor. Hydraulic fluid lines attach to the hydraulic pump to provide hydraulic fluid to a motor on an implement attached to the trailer.

The trailer tongue is removably securable to the trailer tongue coupler in one of a plurality of vertically spaced alignments. The trailer tongue coupler comprises a coupler plate having a plurality of vertically spaced receivers for receiving a plurality of threaded studs on the end of the trailer tongue. The number of receivers exceeds the number of threaded studs to allow adjustment of the vertical alignment of the trailer tongue relative to the trailer tongue coupler. The trailer tongue coupler is connected to the drawbar by a pivot assembly that includes a roll pivot platform pivotally connected to the drawbar to pivot about a longitudinal axis extending in the direction of travel of the tractor. The trailer tongue coupler is pivotally connected to the roll pivot platform about a yaw pivot axis to pivot side to side.

The tongue of the trailer is integral with a main beam of the trailer frame which extends substantially the entire length of the trailer. Side frame members are supported on either side of the main beam by transvers supports which extend through the main beam. The forward end of the side-frame members are angled inward toward the main beam so as to allow for a small turning radius without interfering or making contact with the tractor frame or wheels. The trailer is additionally provided with a suspension system capable of supporting large loads with rear and forward leaf springs supporting the rear and forward axles and whose motion is integrated with a double-sided pivotal shackle. The suspension is stabilized with longitudinal and lateral locating linkages.

BRIEF DESCRIPTION OF THE DRAWINGS

FIG. 1 is a perspective view of the hitch assembly attached to the lift arms of the tractor and the tongue of the trailer.

FIG. 2 is a side view of the hitch assembly attached to the lift arms of the tractor and the tongue of the trailer.

FIG. 3 is a top view of the trailer.

FIG. 4 is a side view of the trailer with a spreader attached thereon.

FIG. 5 is schematic side view of the suspension system.

FIG. 6 is a frontward facing view of the front axle and suspension system.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" is used with reference to an element is the language intended to be limited to one of the elements specified, or any other similarly limited number of elements.

Referring now to FIGS. 1 and 2 in more detail, there is shown a tractor hitch assembly indicated generally by the reference numeral 1 for connecting a trailer 2 to a tractor 3 as generally shown in FIG. 4. The trailer 2 generally comprises a trailer frame 5 with an implement 6 mounted thereon. The tractor hitch assembly 1 generally comprises a drawbar 11, a pivot assembly 13 and a hydraulic pump mount 14. The pivot assembly 13 connects the drawbar 11 to a tongue 15 of a trailer 2. A hydraulic pump 17, driven by the tractor power-take-off (PTO) connecting shaft, is mounted to the hydraulic pump mount 14 which is connected to and supported below the drawbar 11.

The drawbar 11 shown is formed from a length of square tubing. A clevis or drawbar coupler 21 is formed on each end of the drawbar 11. Each clevis 21 comprises a pair of clevis plates 23 and 24 and a clevis pin or latch pin 25 removably disposed between the clevis plates 23 and 24 of the latching members 21. The clevises 21 are used to connect the drawbar 11 to lift arms 26 of a three point hitch of the tractor 3 or to a quick connect coupler (not shown) attached to the three point hitch. Each lift arm 26 is securable to a clevis 21, by sliding a clevis pin 25 through the clevis plates 23 and 24 and a connector ring 27 formed on the end of the lift arm 26. The clevis pin 25 may be a cotter pin or the like with means for holding it in place in the clevis 21. The latch pin 25 and connector ring 27 attachment allows for the hitch assembly 1 to pivot relative to the lift arms 26 about a pitch or transverse axis P from the direction of travel. It is well known in the prior art that the lift arms 26 may be hydraulically actuated to lift and lower the connector rings 27 into place relative to the clevises 21. Once the lift arms 26 are connected to the drawbar 11, it is also well known in the prior art to use the hydraulically actuated lift arms 26 to raise and lower the drawbar 11 into a desired position or to align the hydraulic pump 17 with the tractor PTO. As is well known, a quick connect coupler (not shown) connected to a tractor three point hitch includes latches for automatically latching around the latch pins 25 when the quick connect coupler is advanced into engagement therewith. As used herein, the lift arms 26 alone or with a quick connect coupler attached thereto may be referred to as a tractor coupler assembly or tractor trailer coupler assembly.

The pump mount 14 generally comprises a mounting plate 29 which is connected to the drawbar 11 and extends downward from the bottom surface of the drawbar 11. A drive shaft opening 31 is formed in the mounting plate 29. The hydraulic pump 17 is mounted to the rear surface of the mounting plate 29 (the side opposite the tractor) with threaded fasteners such that a drive shaft 33 of the hydraulic pump 17 extends forwardly through the drive shaft opening 31 in the mounting plate 29. A PTO shaft 35 extending from the tractor 3 connects to the drive shaft 33 of the hydraulic pump 17 using a U-joint 37 in a manner well known by a person having ordinary skill in the art. By mounting the pump 17 to the drawbar 11, once the drawbar 11 is raised to a desired height by the tractor lift arms 26, the position of the PTO shaft 35 remains fixed relative to the tractor 3 and the pump 17 while the trailer 2 moves or pivots relative to the drawbar 11 and the tractor 3 during operation and travel of the implement.

When in use, the hydraulic pump 17 generates a flow of hydraulic fluid under pressure which is transmitted through a hydraulic line 36 to a motor (not shown) on the implement. In the embodiment shown, the implement 6 is a spreader which requires high pressure hydraulic fluid. The high pressure hydraulic fluid from the hydraulic pump powers the implement motor and returns from the motor along a hydraulic return line through a filter (not shown) and into a sump tank (not shown). A hydraulic pump intake line 38 provides hydraulic fluid from the sump tank to the hydraulic pump 17.

As seen in FIGS. 1 and 2, the square tube forming drawbar 11 is straight and generally extends horizontally such that the pump 17 is mounted below the level of the clevises or drawbar couplers 21. The pump 17 is also positioned generally medially between the drawbar couplers or clevises 21.

The pivot assembly 13 comprises a roll pivot platform or roll pivot plate 39 pivotally connected to the drawbar 11 by a roll pivot subassembly 41 and a trailer coupler or yaw pivot plate 43 pivotally connected to the roll pivot plate 39 by a yaw pivot subassembly 45. The trailer tongue 15 is removably securable to the yaw pivot plate 43.

The roll pivot subassembly 41 comprises a pivot pin 49 extending through clevis prongs 51 projecting downward from the roll pivot plate 39 and a first or horizontal bearing sleeve 53 welded or otherwise secured to the drawbar 11 upper surface and extending between the clevis prongs 51. The bearing sleeve 53 and pivot pin 49 extend in axial alignment with the direction the drawbar 11 is drawn by the tractor 3. The roll pivot subassembly 41 allows the roll pivot plate 39 to rotate or roll relative to the drawbar 11 about a horizontal axis R in the direction of travel. The pivot assembly 13, including the roll pivot platform 39 is pivotally connected to the drawbar 11 medially between the drawbar couplers 21 thereon and above the pump 17.

The yaw pivot subassembly 43 is of similar construction having a vertical bearing sleeve 55 mounted on a front surface of the yaw pivot plate or trailer coupler plate 43 and generally extending vertically relative thereto. The vertical bearing sleeve 55 is positioned or captured between a clevis 56 formed by the roll pivot plate or lower clevis prong 39 and an upper clevis prong 57. The upper clevis prong 57 is supported on and spaced above the roll pivot plate 39 by a vertical support 59. A pivot pin 61 extends through the upper and lower clevis prongs 57 and 39 and the vertical bearing sleeve 55. The yaw pivot subassembly 43 allows the tongue mounting plate 43 to pivot relative to the roll pivot plate 39 and about a vertical axis Y extending perpendicular to the direction of travel.

The trailer tongue 15 shown is of a hollow metal box construction. A hitch mounting plate 62 is welded to or otherwise mounted on a forward end 63 of the tongue 15. Two rows of equally spaced and vertically aligned studs 65 project forwardly from the hitch mounting plate 62. The studs 65 are received in corresponding stud receivers 67 formed in the tongue mounting plate 43. As shown in FIG. 1, the number of stud receivers 67 is greater than the number of studs 65 such that the trailer tongue 15 may be mounted at various vertical heights on the tongue attachment member 59. Although only six receivers 67 per row are shown, it is to be understood that the size of the tongue mounting plate 43 and number of receivers 67 could be increased to permit greater variability in the positioning of the hitch and tongue mounting plates 62 and 43.

The trailer 2 is shown in more detail in FIGS. 3-6. The trailer frame 5 is adapted for supporting an implement 6, such as a spreader which may be bolted to or otherwise removably mounted on the trailer frame 5. The trailer tongue 15 may be described as being integrally formed with a main beam 103 for the trailer frame 5. The trailer frame 5 further includes a plurality of transverse support members 111, side-frame members 113 and 114, and a wheel and suspension assembly 115 (See FIGS. 5 and 6).

The main beam 103, including integral tongue 15, extends centrally along the entire length or substantially the entire length of the trailer frame 5 from the hitch assembly 1 and serves as the primary support structure for the implement 6. The main beam 103 is preferably a hollow metal box beam of heavy-duty construction. Side-frame members 113 and 114 are formed from C-shaped channel members and extend in parallel and spaced relation from the main beam 103 for a substantial portion of their length. The left and right side-frame members 113 and 114 each comprise three sections: a tongue attachment section 125, an angled section 127, and side rail section 129. The tongue attachment section 125 is attached parallel to and flush with the respective side surface of the main beam 103. The angled section 127 extends rearwardly and outwardly from the tongue attachment section 125 at an acute angle relative to the main beam 103. The side rail section 129 extends rearwardly from the angled section 127 and parallel to the main beam 103. The angled section 127 of the side-frame members 113 and 114 allows a tighter or smaller turning radius for a tractor 3 pulling the trailer 2 without interference between the trailer frame 5 and the tractor tires.

The transverse support members 111 are disposed between the left and right side rail sections 129 of the side-frame members 113 and 114 and extend through the main beam 103 at spaced intervals along the length of the trailer frame 5, as shown in FIG. 3. The transverse support members 111 may be formed from metal u-shaped channel members of heavy duty construction extended through U-shaped slots formed in the main beam 103 and then welded to the main beam 103. Referring to FIG. 6, frame mounting members 109 and 110 connect the ends of the transverse support members 111 to the side-frame sections 113 and 114. Openings 112 formed through the frame mounting members 109 and 110 facilitate the running of wiring harnesses or hydraulic lines through the trailer frame 103. Because the side-frame members 113 and 114 do not extend near the forward end of the trailer tongue 15 the tractor 3 may make a sharper or tighter turn when pulling the trailer 2.

Referring now in more detail to FIGS. 5 and 6, the wheel and suspension system of the trailer is generally indicated by reference numeral 115. The leftward and rearward sides of the suspension system 115 are substantially the same. Except for the differences noted, only one side of the suspension system is needed to be described herein. The suspension system 115 of the present embodiment is a leaf spring-type suspension system designed for the four-wheel, two-axle trailer 2 but may be easily adapted for use on a trailer having a greater number of axles. Leaf springs 211 and 212 of the suspension system 115 shown are multiple-leaf leaf springs and may be one of any type of leaf spring including an elliptical, semi-elliptical or parabolic type leaf spring.

Referring now to a side, and schematic view of the suspension system 201, as shown in FIG. 5, the suspension of the forward axle is first described. The front leaf spring 211 is received or supported at a forward end 215 by a front support member 219 and attached at the back end 216 to the forward end 220 of a double sided shackle 221. The front end 215 of the leaf spring 211 is preferably fixed within the front support member 219 as commonly known by one having ordinary skill in the art. The shackle 221 is pivotally supported on a shackle support member 223; wherein the shackle 221 extends to both the forward and rearward sides thereof.

A front axle housing 228 supporting a pair of stub axles 229 therein is supported on and clamped to the front leaf spring 211 between a front axle clamp base 231 and U-bolts 232 generally at the middle or lowest portion of the bowed leaf spring 211. A front axle locating linkage 239 is connected to and extends between the forward axle clamp base 231 and the forward leaf spring end support member 219. The forward locating linkage 239 locates the axle in the longitudinal direction of the trailer.

The rear leaf spring 212 is supported at a back end 241 by a rear leaf spring end support member 243 and attached at a front end 242 to a rear end 245 of the double sided shackle 221. The back end 241 of the leaf spring 212 is preferably fixed within the end support member 243 in a manner well known in the art.

A rear axle housing 247 supporting a pair of stub axles 249 therein is supported on and clamped to the rear leaf spring 212 between a rear axle clamp base 251 and U-bolts 252 generally at the middle or lowest portion of the bowed leaf spring 212. A rear axle locating linkage 255 is connected to and extends between the rear axle clamp base 251 and the shackle support member 223. The rear axle locating linkage 255 locates the rear stub axles 249 in the longitudinal direction of the trailer.

Referring now to view of the suspension system 115 of the front axle assembly as shown in FIG. 6, the suspension system 115 and trailer frame 5 are further described. It is to be understood that the suspension systems of the forward and rearward axles are substantially mirror images of each other. As shown in the present embodiment, the front stub axles 229 are supported within the front axle housing 228 on bearings not shown with front trailer wheels 263 connected to the stub axles 229. Similarly, rear trailer wheels 264 are connected to the rear stub axles 249 supported by bearings in the rear axle housing 247. As described above, the front axle housing 228 is support by and clamped to the front leaf spring 211.

The suspension of each axle assembly further includes a lateral locating linkage or Panhard rod 271 for laterally locating the axle housing, such as front axle housing 228. The Panhard rod 271 comprises a rigid bar pivotally connected at one end 273 to the axle housing 235 and pivotally connected at the other end 275 to the main beam 103. The Panhard rod 271 is attached such that the rod 271 is at an angle relative to but in the same vertical plane as the axle housing 228. Additionally, the pivotal attachment point on the axle housing 228 is on the leftward side of the trailer and the pivotal attachment point on the main beam 103 is on the rightward side of the trailer 2. It is foreseen that the pivotal attachment point on the axle housing 228 may be on the rightward side of the trailer 2 and the pivotal attachment point on the main beam 103 may be on the leftward side of the trailer 2.

The forces acting on the Panhard rod 271 to maintain the proper lateral location of the axle housing 228 relative to the trailer frame 5 as the trailer 2 turns are directed to the main beam 103. The main beam 103 is sized to handle the torque and other forces exerted thereon during turning of the trailer 2. In trailer frames formed as a rectangular box, considerable amounts of bracing is required to handle the forces exerted on the frame particularly during turning. Use of a relatively large central main beam 103 in the trailer construction described herein allows the overall amount of metal used in the frame members and bracing to be reduced, reducing the overall weight of the trailer frame 5.

While a preferred embodiment and several alternatives of the present invention have been described, it should be understood that various changes, adaptations and modifications may be made therein without departing from the spirit of the invention and the scope of the appended claims.

I claim:

1. A hitch assembly for connecting a trailer to a tractor, said hitch assembly comprising:
   a drawbar having drawbar couplers mounted on opposite ends thereof, each drawbar coupler adapted for coupling to a tractor coupler assembly connected to the tractor;
   a pump mount connected to said drawbar and extending below said drawbar and said drawbar couplers;
   a hydraulic pump mounted on said pump mount and supported below said drawbar and said drawbar couplers;
   a pivot assembly comprising a roll pivot platform pivotally connected above and to said drawbar between said drawbar couplers; said roll pivot platform pivotal about a roll axis aligned with a direction of travel of the tractor to which the hitch assembly is to be connected; said pivot assembly further comprising a trailer tongue coupler removably securable to a tongue of a trailer, said trailer tongue coupler pivotally connected to said roll pivot platform and pivotal about a yaw axis extending perpendicular to said roll axis.

2. The hitch assembly as in claim 1 wherein said trailer tongue is selectively securable to said trailer tongue coupler in a plurality of vertically spaced alignments.

3. The hitch assembly as in claim 1 wherein said trailer tongue coupler comprises a coupler plate with a bearing sleeve secured thereto such that an axis of said bearing sleeve extends generally vertically relative to said roll pivot platform; said bearing sleeve pivots about a pivot pin connected to said roll pivot platform and extending perpendicular relative to said roll axis.

4. The hitch assembly as in claim 3 wherein said coupler plate has a plurality of vertically spaced bolt holes formed therein on either side of said bearing sleeve; said bolt holes adapted to receive threaded studs projecting from an end of the trailer tongue for bolting said coupler plate to said tongue, wherein the number of vertically spaced bolt holes on either side of said bearing sleeve exceeds the number of bolts on said trailer tongue positioned for reception in said bolt holes such that the vertical spacing of the trailer tongue relative to the coupler plate is selectively adjustable.

5. The hitch assembly as in claim 1 further in combination with said trailer wherein said trailer tongue is formed as part of a main beam extending along substantially the entire length of said trailer centrally thereof.

6. The hitch assembly in combination with said trailer as in claim 5 wherein said trailer further comprises a pair of side-frame members extending parallel to said main beam; an axle assembly supported below said main beam and said side-frame members on a suspension assembly connected to said side-frame members and a locating rod extending between said main beam and said axle assembly to limit lateral movement of said axle assembly relative to said main beam.

7. A pull-type trailer for a tractor including a pair of lift arms, said trailer comprising:
   a trailer frame including a main beam having a trailer tongue integrally formed therewith, said main beam extending substantially the entire length of said trailer along a longitudinal axis thereof;
   a hitch assembly for connecting the trailer frame to the lift arms on the tractor, said hitch assembly comprising:
   a drawbar having drawbar couplers mounted on opposite ends thereof, each drawbar coupler adapted for coupling one of the pair of lift arms thereto;
   a pump mount connected to said drawbar and extending below said drawbar and said drawbar couplers;
   a hydraulic pump mounted on said pump mount and supported below said drawbar and said drawbar couplers;
   a pivot assembly comprising a roll pivot platform pivotally connected above and to said drawbar between said drawbar couplers; said roll pivot platform pivotal about a roll axis aligned with a direction of travel of the tractor to which the hitch assembly is to be connected; said pivot assembly further comprising a trailer tongue coupler removably securable to the tongue of the trailer frame, said trailer tongue coupler pivotally connected to said roll pivot platform and pivotal about a yaw axis extending perpendicular to said roll axis; wherein said trailer tongue is selectively securable to said trailer tongue coupler in a plurality of vertically spaced alignments.

8. The pull-type trailer as in claim 7, said trailer further comprising left and right side-frame members supported in parallel spaced relation from said main beam by a plurality of transverse support members extending through said main beam.

9. The pull-type trailer as in claim 8 including an axle assembly supported below said left and right side-frame members on a suspension assembly connected to said left and right side-frame members and a locating rod extending between said main beam and said axle assembly to limit lateral movement of said axle assembly relative to said main beam.

10. The pull-type trailer as in claim 8 further comprising an hydraulically operable implement removably supported on said trailer frame.

11. The pull-type trailer as in claim 10 wherein said implement is a spreader.

* * * * *